(12) United States Patent
Baroudi et al.

(10) Patent No.: US 9,883,323 B2
(45) Date of Patent: *Jan. 30, 2018

(54) EFFICIENT ROUTING FOR ENERGY HARVEST AND QUALITY OF SERVICE IN WIRELESS SENSOR NETWORKS

(71) Applicant: KING FAHD UNIVERSITY OF PETROLEUM AND MINERALS, Dhahran (SA)

(72) Inventors: Uthman Baroudi, Dhahran (SA); Emad Ahmad Aldalu, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 15/281,805

(22) Filed: Sep. 30, 2016

(65) Prior Publication Data
US 2017/0245096 A1 Aug. 24, 2017

Related U.S. Application Data

(63) Continuation of application No. 15/051,181, filed on Feb. 23, 2016, now Pat. No. 9,467,925.

(51) Int. Cl.
*H04B 7/00* (2006.01)
*H04W 4/00* (2009.01)
(Continued)

(52) U.S. Cl.
CPC ......... *H04W 4/006* (2013.01); *H04L 41/0803* (2013.01); *H04W 40/10* (2013.01); *H04W 84/18* (2013.01); *H04W 88/16* (2013.01)

(58) Field of Classification Search
USPC .............................. 455/445, 500, 41.1–41.3
See application file for complete search history.

(56) References Cited

U.S. PATENT DOCUMENTS 9,270,491 B2* 2/2016 Margalit ............. H04L 12/6418
2005/0135360 A1 6/2005 Shin et al.
(Continued)

FOREIGN PATENT DOCUMENTS

CN 102413538 B 7/2014

OTHER PUBLICATIONS

Pu Gong, et al., "ETARP: An Energy Efficient Trust-Aware Routing Protocol for Wireless Sensor Networks", Journal of Sensors, (2015), pp. 1-10.

(Continued)

*Primary Examiner* — Fayyaz Alam
(74) *Attorney, Agent, or Firm* — Oblon, McClelland, Maier & Neustadt, L.L.P.

(57) ABSTRACT

A WSN has multiple sensor nodes, a bi-directional gateway sensor node, and a server. The WSN also includes circuitry configured to process a route request message from an origination sensor node to a destination sensor node. A message packet of each of the sensor nodes includes a minimum energy field, a minimum energy harvesting rate field, and a sum of energy field. The circuitry is also configured to determine a new delivery route based upon comparing a minimum energy and a minimum energy harvesting rate of an instant sensor node with a minimum energy and a minimum energy harvesting rate contained in the message packet, and select a lower minimum energy and a lower minimum energy harvesting rate from the instant sensor node or the message packet. The circuitry is also configured to broadcast the lower minimum energy and the lower minimum energy harvesting rate throughout the WSN.

8 Claims, 14 Drawing Sheets

(51) Int. Cl.
  *H04W 40/10*  (2009.01)
  *H04L 12/24*  (2006.01)
  *H04W 84/18*  (2009.01)
  *H04W 88/16*  (2009.01)

(56) References Cited

U.S. PATENT DOCUMENTS

| | | | | |
|---|---|---|---|---|
| 2006/0039371 A1* | 2/2006 | Castro | ............... | H04L 12/42 370/389 |
| 2011/0141888 A1* | 6/2011 | Leguay | ............... | H04L 47/10 370/230 |
| 2012/0327792 A1* | 12/2012 | Guo | ............... | H04W 40/02 370/252 |

OTHER PUBLICATIONS

Chee-Wah Tan, et al., "Modifying AODV for Efficient Power-Aware Routinu in MANETs", IEEE, (2005), 6 pages.

Rahman Doost, et al., "Routing and Link Layer Protocol Design for Sensor Networks with Wireless Energy Transfer", IEEE, (2010), 5 pages.

Mehdi Lotfi, et al., "A New Energy Efficient Routing Algorithm Based on a New Cost Function in Wireless Ad hoc Networks". Journal of Computing, vol. 2, Issue 6, Jun. 2010, pp. 129-133.

Pu Gong, et al., "Energy Harvesting Aware Routing Protocol for Wireless Sensor Networks", 9$^{th}$ International Symposium on Communication Systems, Networks & Digital Sign (CSNDSP), (2014), pp. 171-176.

* cited by examiner

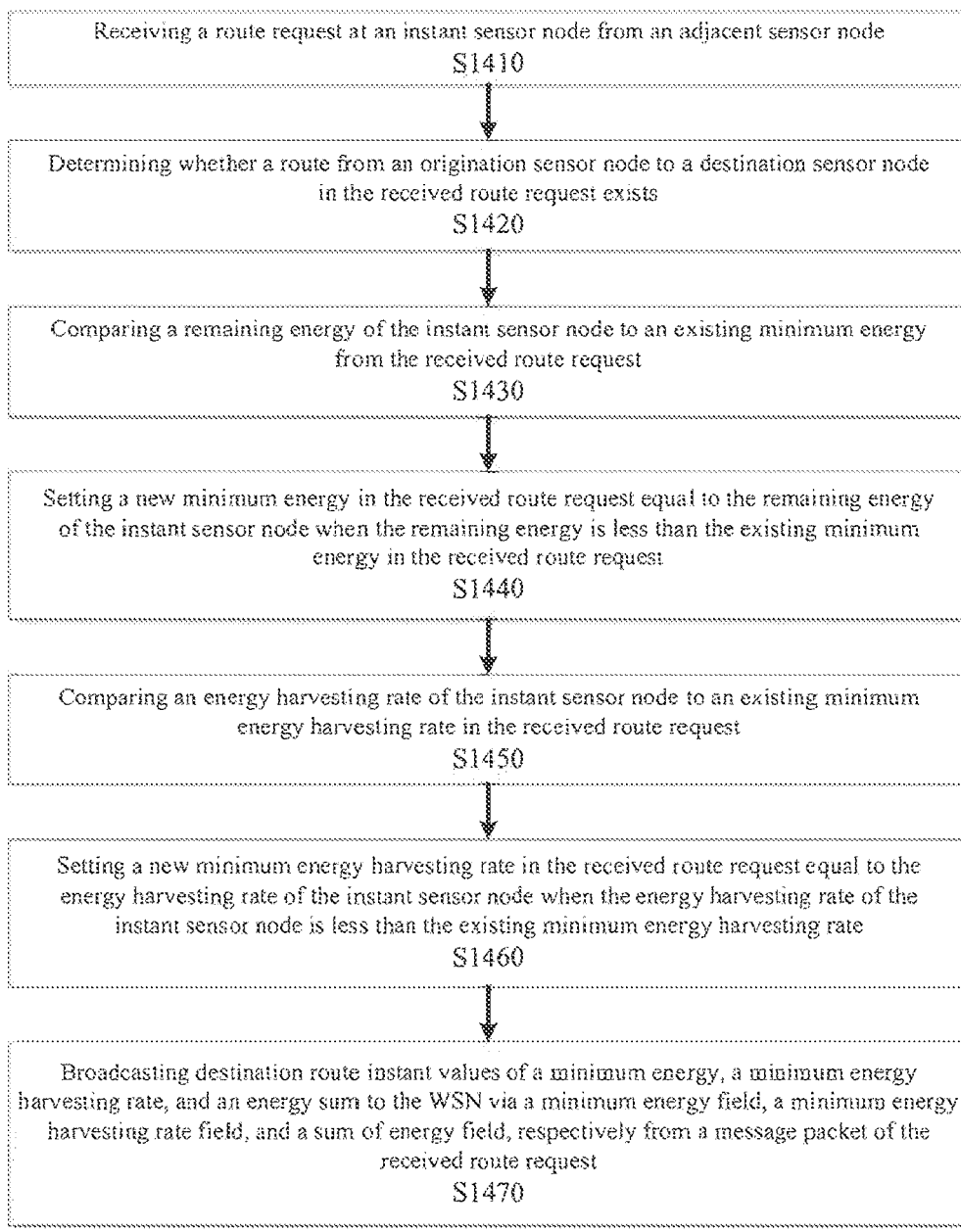

EFFICIENT ROUTING FOR ENERGY HARVEST AND QUALITY OF SERVICE IN WIRELESS SENSOR NETWORKS

CROSS REFERENCE TO RELATED APPLICATIONS

This application is a continuation of Ser. No. 15/051,181, allowed.

BACKGROUND

A routing protocol is responsible for building communication paths from a source node to a destination node in a wireless sensor network (WSN). Ad hoc On demand Distance Vector (AODV) is a routing protocol used in communication within WSNs and smart grids (SGs). See N. Saputro, K. Akkaya, and S. Uludag, "A survey of routing protocols for smart grid communications," *Computer Networks*, vol. 56, pp. 2742-2771, 2012, incorporated herein by reference in its entirety. AODV supports both unicast and broadcast routing. See C. E. Perkins, *Ad hoc networking*: Addison-Wesley Professional, 2008, incorporated herein by reference in its entirety.

Doost et al. proposed a routing metric based on the charging ability of the sensor nodes. See R. Doost, K. R. Chowdhury, and M. Di Felice, "Routing and link layer protocol design for sensor networks with wireless energy transfer," in *Global Telecommunications Conference (GLOBECOM2010), 2010 IEEE*, 2010, pp. 1-5, incorporated herein by reference in its entirety. The routing metric attempts to prolong the network lifetime by using nodes having the best energy-charging characteristics. The routing metric is based on the node charging time, wherein charging time is defined as the time needed for the node battery to be fully charged. The routing metric uses single-path routing in which the best path is chosen by the destination. The energy-harvesting technique is limited to wireless electromagnetic waves.

Tan and Bose proposed a power-aware routing protocol for Molecular Ancestry Networks (MANETs) based on AODV called PAW-AODV. See C. W. Tan and S. K. Bose, "Modifying AODV for efficient power-aware routing in MANETs," in *TENCON 2005 2005 IEEE Region 10*, 2005, pp. 1-6, incorporated herein by reference in its entirety. The routes in PAW-AODV are chosen based on a power-based cost function. The cost function of a route was defined as the sum of the cost functions of the individual nodes along the route. The cost function of an individual node depends on the available battery power of the node. PAW-AODV is a single path routing protocol. It considers the energy in general, but not the energy harvesting.

Lotfi et al. proposed a routing protocol based on a power-aware cost function. See M. Lotfi, S. Jabbehdari, and M. A. Shahmirzadi, "A new energy efficient routing algorithm based on a new cost function in wireless ad hoc networks," *arXiv preprint arXiv: 1006.455 7*, 2010, incorporated herein by reference in its entirety. Additional variables were added to the route request message to collect necessary information throughout the network to make decision(s) about the routing. A request-size (reqSize) field represents the size of data the source node is going to send. Unstable Nodes Count field holds the number of unstable nodes which have a rate of change higher than a threshold. Sum of Neighbors field holds the sum of neighbors of all nodes across the path. Sum of Buffered Packets field holds the sum of buffered packets in all nodes across the path. The cost is calculated at the destination as a sum of weighted values of the above three fields. The destination sends a route reply message throughout the path of least cost. The routing protocol is a single path. The best path is chosen at the destination.

Li et al. proposed an Enhanced Ad-Hoc On-demand Distance Vector routing protocol (EAODV). See W. Li, M. Chen, and M.-m. Li, "An enhanced aodv route protocol applying in the wireless sensor networks," in *Fuzzy Information and Engineering Volume 2*, ed: Springer, 2009, pp. 1591-1600, incorporated herein by reference in its entirety. EAODV searches for paths having nodes which have the most proper transmitting power. It chooses the minimal power consumption route by comparing the existing routes. Results have shown that EAODV reduces the transmitting power and also reduces collisions.

Gong et al. proposed Energy Harvesting Aware Ad hoc On-Demand Distance Vector (EHAODV) routing protocol which uses the energy harvesting capability of the sensor nodes in the network. See P. Gong, Q. Xu, and T. M. Chen, "Energy Harvesting Aware routing protocol for wireless sensor networks," in *Communication Systems, Networks & Digital Signal Processing (CSNDSP), 2014 9th International Symposium on*, 2014, pp. 171-176, incorporated herein by reference in its entirety. Results have shown the protocol reduced the packet delivery energy cost in comparison to original AODV.

Poongkuzhali et al. proposed Optimized Power Reactive Routing (OPRR) protocol for MANETs based on AODV. See T. Poongkuzhali, V. Bharathi, and P. Vijayakumar, "An optimized power reactive routing based on AODV protocol for Mobile Ad-hoc network," in *Recent Trends in Information Technology (ICRTIT), 2011 International Conference on*, 2011, pp. 194-199, incorporated herein by reference in its entirety. The technique includes adding a new field to the Route Request (RREQ) message. The new field maintains the available power of all neighboring nodes of the entire path. While the RREQ is propagating, each node adds the sum of available power of its neighboring nodes to the power field. However, the average path power by itself is not sufficient to identify the best path. According to this approach, a best path could include a node that has very low energy. In addition, this approach doesn't utilize the routing information in the intermediate nodes, and it is a single path routing protocol.

Table 1 summarizes the different routing metrics of the different protocols described above.

TABLE 1

Routing Metrics for Energy-Aware Protocols.

| Protocol | Metric | | | | | |
|---|---|---|---|---|---|---|
| | Remaining energy | Energy harvesting rate | Average energy | Route repair | Remaining lifetime | Request size |
| EHAODV | ✓ | ✓ | ✓ | ✓ | x | x |
| Doost et al. | ✓ | ✓ | x | x | x | x |
| Tan, Boso | ✓ | x | x | x | x | x |
| Lotfi et al. | ✓ | x | x | x | ✓ | ✓ |
| Poongkuzhali et al. | ✓ | x | ✓ | x | x | x |
| Gong et al. | x | ✓ | x | x | x | x |

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

SUMMARY

A routing protocol for energy harvesting in a WSN which targets Quality of Service (QoS), such as high throughput, low packet loss ratio, and low network latency is described herein. The protocol exploits the nodes' remaining energy, energy harvesting rate, and path sum of energy in building the routes.

An embodiment includes a WSN having a plurality of sensor nodes that are configured with a radio transceiver and electronic circuitry for interfacing with one or more associated sensors. The WSN also includes a gateway sensor node configured to receive sensor data from and forward instructions to the one or more sensor nodes, and a server configured to control the WSN in combination with the gateway sensor node. The WSN also includes circuitry configured to process a route request message from an origination sensor node to a destination sensor node via a routing protocol. A message packet of each of the plurality of sensor nodes includes a minimum energy field, a minimum energy harvesting rate field, and a sum of energy field. The circuitry is also configured to determine a new delivery route based upon comparing a minimum energy and a minimum energy harvesting rate of an instant sensor node with a minimum energy and a minimum energy harvesting rate contained in the message packet, and select a lower minimum energy and a lower minimum energy harvesting rate from the instant sensor node or the message packet. The circuitry is also configured to broadcast the lower minimum energy and the lower minimum energy harvesting rate throughout the WSN, and continue the processing, determining, and broadcasting until the destination sensor node is reached.

Another embodiment includes a method of locating a route in a WSN, which includes receiving a route request at an instant sensor node from an adjacent sensor node, determining whether a route from an origination sensor node to a destination sensor node in the received route request exists, and comparing a remaining energy of the instant sensor node to an existing minimum energy from the received route request. The method also includes setting a new minimum energy in the received route request equal to the remaining energy of the instant sensor node when the remaining energy is less than the existing minimum energy, and comparing an energy harvesting rate of the instant sensor node to an existing minimum energy harvesting rate in the received route request. The method also includes setting a new minimum energy harvesting rate in the received route request equal to the energy harvesting rate of the instant sensor node when the energy harvesting rate is less than the existing minimum energy harvesting rate. The method also includes broadcasting destination route instant values of a minimum energy, a minimum energy harvesting rate, and an energy sum to the WSN via a minimum energy field, a minimum energy harvesting rate field, and a sum of energy field, respectively from a message packet of the received route request. The WSN includes a plurality of sensor nodes configured with circuitry to receive sensor data from one or more connected sensors.

Another embodiment includes a WSN having a plurality of sensor nodes, wherein each of the sensor nodes has circuitry configured to receive a route request at an instant sensor node from an adjacent sensor node, and determine whether a route from an origination sensor node to a destination sensor node in the received route request exists. The circuitry is also configured to compare a remaining energy of the instant sensor node to an existing minimum energy from the received route request, and set a new minimum energy in the received route request equal to the remaining energy of the instant sensor node when the remaining energy is less than the existing minimum energy. The circuitry is also configured to compare an energy harvesting rate of the instant sensor node to an existing minimum energy harvesting rate in the received route request, and set a new minimum energy harvesting rate in the received route request equal to the energy harvesting rate of the instant sensor node when the energy harvesting rate is less than the existing minimum energy harvesting rate. The circuitry is also configured to broadcast destination route instant values of a minimum energy, a minimum energy harvesting rate, and an energy sum to the WSN via a minimum energy field, a minimum energy harvesting rate field, and a sum of energy field, respectively from a message packet of the received route request.

The foregoing paragraphs have been provided by way of general introduction, and are not intended to limit the scope of the following claims. The described embodiments will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 is an exemplary algorithmic flowchart for a method of locating a route in a WSN according to an embodiment.

DETAILED DESCRIPTION

Embodiments described herein modify AODV protocol to collect the energy and energy harvesting information along the route discovery path, and use this information and the hop-count in the route selection criteria. The objective for collecting the energy information is to exclude the nodes which have energy levels less than a threshold level from being included in any routing path and choose nodes which have high energy levels to carry the communication.

The energy level and energy harvesting rate of a node play a major role in Energy Harvesting AODV (EHAODV) protocol. The node has a battery in which it saves its energy. A zero battery level indicates the node energy is fully discharged. The battery capacity is assumed to be high enough so the node can save all of its harvested energy.

The node battery level varies continuously based on the node activity. Each time the node receives or sends a packet, it loses some energy. Depending on the ambient energy availability, the node charges its battery. It is important to optimize the routing, such that the harvested energy doesn't get wasted.

A message packet, such as a RREQ packet or a Route Reply (RREP) packet contains fields by which it can be navigated throughout the WSN. Fields can include a type of packet, the number of hop counts, a RREQ identification, a destination IP address, a destination sequence number, an originator IP address, and an originator sequence number. Other fields can also be included depending upon the type of packet or message and the objective of the packet or message.

Figure 1:
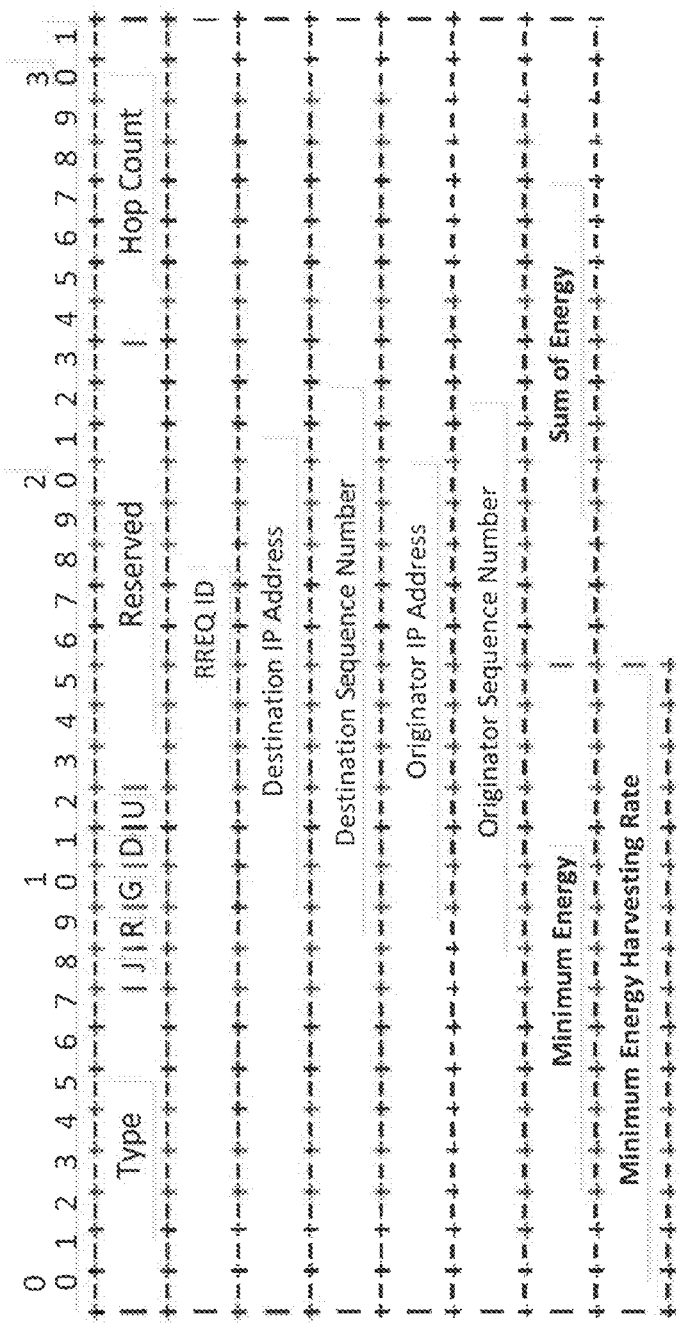
FIG. 1 illustrates an exemplary format of an RREQ message packet according to an embodiment.

Embodiments described herein include three additional fields to RREQ and RREP packets of EHAODV. A first field is minEnergy, which stores the minimum available energy of the nodes along the path in which the RREQ or the RREP is propagating. A second field is sumEnergy, which stores the sum of the available energy of the nodes along the path in which the RREQ or the RREP is propagating. A third field is minHarRate, which stores the minimum energy harvesting rate of the nodes along the path in which the RREQ or the RREP is propagating. These three fields along with the hop count are used as criteria to choose the most efficient route. FIG. 1 illustrates an exemplary format of a RREQ message packet. The added fields are shown in bold.

Figure 2:
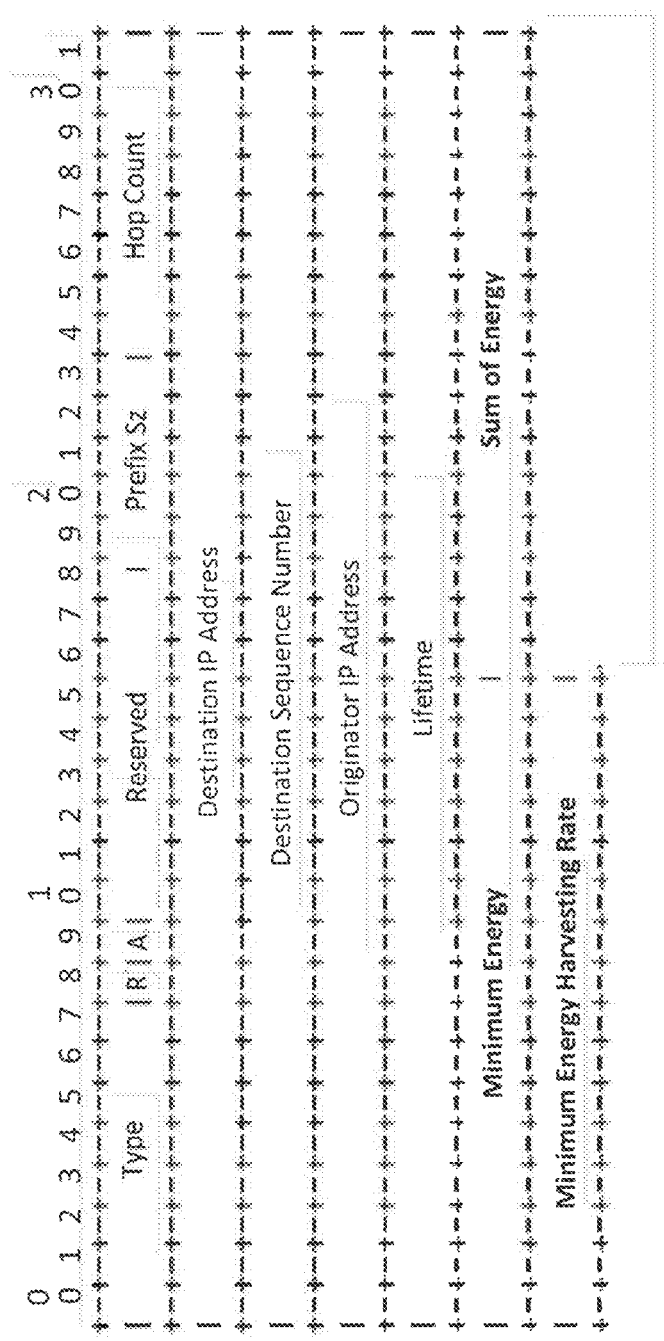
FIG. 2 illustrates an exemplary format of a Route Reply (RREP) message packet according to an embodiment.

The three fields are added to a RREQ message in order to trace the energy information in the reverse route entries while the RREQ is propagating, which is added to the RREP message to trace the energy information in the forward routing entries while the RREP is traveling to the originator node. FIG. 2 illustrates an exemplary format of a RREP message packet. The added fields are shown in bold.

When the source node has a data packet destined to a remote node, it checks its routing table to determine whether a route already exists for the destination node. If no route exists for the destination node, the source node begins a route discovery process. The route discovery process is initiated by the source node by broadcasting a RREQ message throughout the network. The destination IP address in the RREQ is set to the IP address of the destination node.

Figure 3:
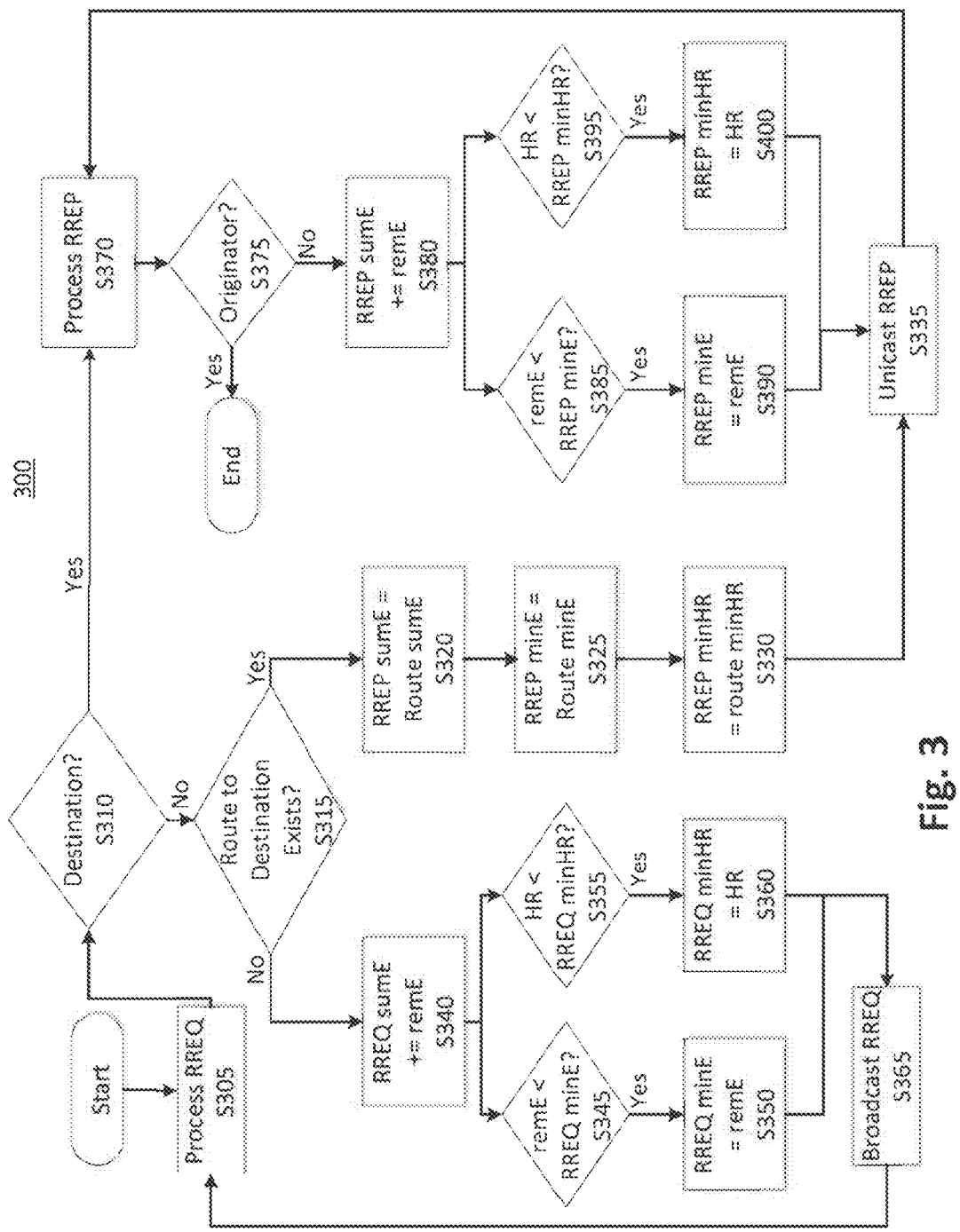
FIG. 3 is an exemplary algorithm illustrating how a node utilizes energy fields according to an embodiment.

FIG. 3 is an exemplary algorithm 300 illustrating how the node utilizes the three energy fields. The route entries have a timeout value indicating the freshness of the route. Initially, minEnergy and sumEnergy are set to the remaining energy of the source node, and minHarRate is also set to the energy harvesting rate of the source node. When the RREQ reaches a neighboring node, the neighboring node builds a reverse route back to the originator node (the source node in this case). It compares its remaining energy with the minEnergy field in the RREQ message. If the remaining energy of the neighboring node is less than the minEnergy field, it updates the RREQ with its energy. Otherwise, it leaves the value as it is. The neighboring node adds its remaining energy to the sumEnergy field in the RREQ and updates the field with the total energy sum. The process of updating minHarRate is similar to minEnergy. The neighboring node updates the field if its energy harvesting rate is less than the RREQ field. Otherwise, it leaves the value as it is. The neighboring node checks to see if it is the desired destination. If not, it broadcasts the RREQ to its neighboring node (a second node away from the source node). This process continues until the RREQ reaches the desired destination.

The route entry in EHAODV includes the three additional fields of minimum energy, sum of energy, and minimum energy harvesting rate. If an intermediate node receives a RREQ to a destination in which it already has a fresh route to the destination, the intermediate node responds with a RREP message. The intermediate node compares its remaining energy with the minimum energy in the route entry and sets the minimum of the two values in the RREP message. The intermediate node does the same thing for the minimum harvesting rate field, in which it compares its harvesting rate with the minimum harvesting rate field and sets the minimum of the two values in the RREP message. The intermediate node adds its remaining energy to the energy sum of the existing route and sets the sum in the RREP field. The process continues until the origination node is reached.

In FIG. 3, exemplary algorithm 300 begins processing a RREQ in step S305. The subject node determines whether it is the destination node identified in the RREQ in step S310. If it is not the destination node (a "no" decision in step S310), it determines whether a route to the destination node already exists in step S315. If a route to the destination node already exists (a "yes" decision in step S315), the sum of energy (sumE) in a RREP is set equal to the route sumE in step S320. The minimum energy (minE) in the RREP is set equal to the route minE in step S325, and the minimum energy harvesting rate (minHR) in the RREP is set equal to the route minHR in step S330.

If the subject node does not already have a route to the destination node (a "no" decision in step S315), the subject node adds its remaining energy (remE) to the sumE field of the RREQ and updates the field with the sum in step S340. If the remE is less than the minE of the RREQ in step S345, the remE of the subject node is set equal to the minE of the RREQ in step S350. If the HR of the subject node is less than the minHR of the RREQ in step S355, the HR is set equal to the minHR of the RREQ in step S360. The RREQ is then broadcast in step S365, wherein the RREQ process begins anew in the next adjacent node at step S305.

The RREP is processed at step S370, and the subject node determines whether it is the originator node in step S375. If the subject node is the originator node (a "yes" decision in step S375), the process ends. If the subject node is not the originator node (a "no" decision in step S375), the remE of the subject node is added to the sumE of the RREP in step S380. If the remE of the subject node is less than the minE of the RREP in step S385, the remE is set equal to the minE of the RREP in step S390. If the HR of the subject node is less than the minHR of the RREP in step S395, the HR is set equal to the minHR of the RREP in step S400. The RREP is then unicast in step S335 and the RREP is processed in the next adjacent node at step S370.

Figure 4:
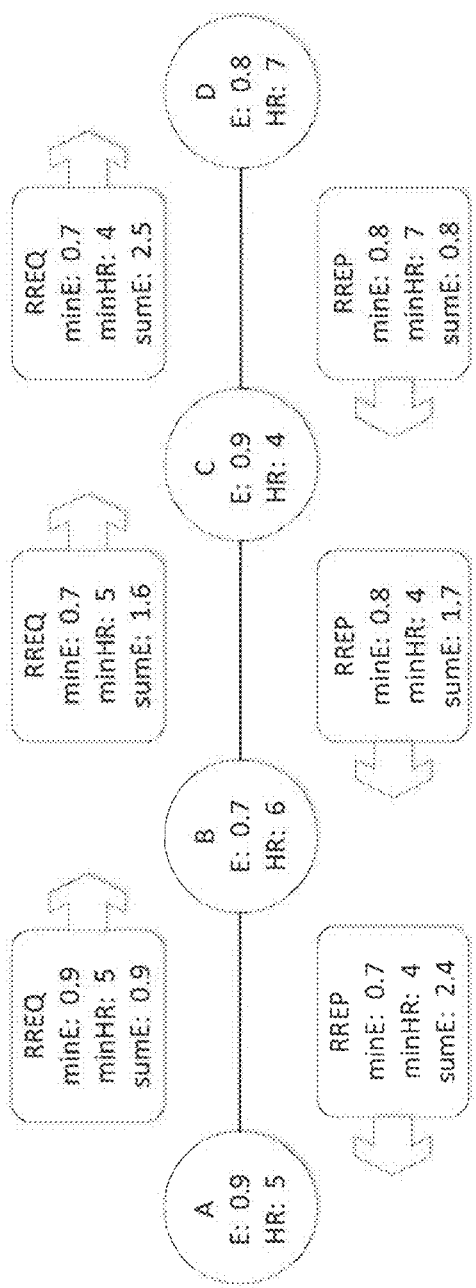
FIG. 4 illustrates a route discovery process for a plurality of nodes according to an embodiment.

FIG. 4 illustrates a route discovery process for a plurality of nodes. Only four nodes are used for ease of illustration.

However, the route discovery process is applicable for a larger group of nodes within a WSN. In addition, only the three additional fields described herein are illustrated in FIG. 4. However, other fields within the packet are present. Node A (source node) has data to be sent to node D (destination node), but it doesn't have an established route to Node D. Node A begins a route discovery process by broadcasting a RREQ message with destination D. Since intermediate Node B doesn't have a route to Node D, it updates the RREQ message based on its energy information and rebroadcasts the message. The same processing occurs at Node C. When the RREQ reaches Node D, it replies with a RREP message. The reverse and forward routes are included within the source node, the intermediate node(s), and the destination node. After the route discovery process finishes, Node A learns the route in which it can reach Node D.

At Node A, the path minimum energy (E) is equal to 0.9 and the energy harvesting rate (HR) is equal to 5. Therefore, the RREQ sets the minE and the sumE at 0.9, and the minHR at 5. The next hop from Node A is Node B, wherein the path minimum energy of the RREQ is set to 0.7 (the lesser of the existing RREQ and Node B), the path minimum energy harvesting rate is set to 5 (the lesser of the existing RREQ and Node B), and the path sum of energy is set to 1.6 (the energy total of the existing RREQ+Node B). The next hop is Node C, wherein the path minimum energy of the RREQ is set to 0.7 (the lesser of the existing RREQ and Node C), the path minimum energy harvesting rate is set to 4 (the lesser of the existing RREQ and Node C), and the path sum of energy is set to 2.5 (the energy total of the existing RREQ+Node C). The next hop is Node D, wherein the total energy to reach the destination node D is 3.3 (the energy total of the existing RREQ+Node D). The path minimum energy remains at 0.7 and the path minimum harvesting rate remains at 4.

Table 2 shows the routing table of node A, which includes two entries.

| Destination | Next-hop | Hop-count | Min energy | Min harvesting rate | Sum of energy |
|---|---|---|---|---|---|
| B | B | 1 | 0.7 | 5 | 1.6 |
| D | B | 3 | 0.7 | 4 | 3.3 |

The first entry is for the neighboring Node B. The route entries for the neighboring nodes are automatically created in AODV after exchanging the hello messages. The process of creating the routes to neighboring nodes is called local connectivity. The second route entry is for the destination Node D. This entry is created after the route discovery process has taken place.

A route selection is based on metrics including path length, bandwidth, delay, hop count, etc. See S. Ehsan and B. Hamdaoui, "A survey on energy-efficient routing techniques with QoS assurances for wireless multimedia sensor networks," *Communications Surveys & Tutorials, IEEE*, vol. 14, pp. 265-278, 2012, incorporated herein by reference in its entirety. AODV protocol is a single path routing protocol i.e. the source creates only one route entry to the destination. AOMDV is a multipath version of AODV. See M. K. Marina and S. R. Das, "Ad hoc on-demand multipath distance vector routing," *ACM SIGMOBILE Mobile Computing and Communications Review*, vol. 6, pp. 92-93, 2002, incorporated herein by reference in its entirety. It builds multiple paths during route discovery. When a route is broken, the protocol picks another route from the table.

The energy fields along with the hop-count of the route are used in EHAODV to choose the best route to the destination. The source node can receive multiple RREP messages from different paths. In AODV, when the source node receives the first RREP, it creates a route based on that RREP. If the source node receives another RREP with a lower number of hops, the source node updates its routing table with the new path. In EHAODV, the selection criteria depends on the route minEnergy, sumEnergy, and minHR in addition to hop-count.

Two energy thresholds are used in EHAODV. The first one is the normal energy threshold (Enormth) which indicates a high available energy level in which the node is capable of operating without causing a severe loss of energy that can lead the node to die. The second one is the minimum energy threshold (Eminth) which indicates a low available energy level. When the node energy level becomes less than Eminth, the node stops operating to avoid a power outage. A node with available energy less than Eminth is avoided when choosing the route, and a better route is sought. The source node does not build a route that doesn't satisfy the condition of minimum energy being higher than Eminth.

Figure 5:
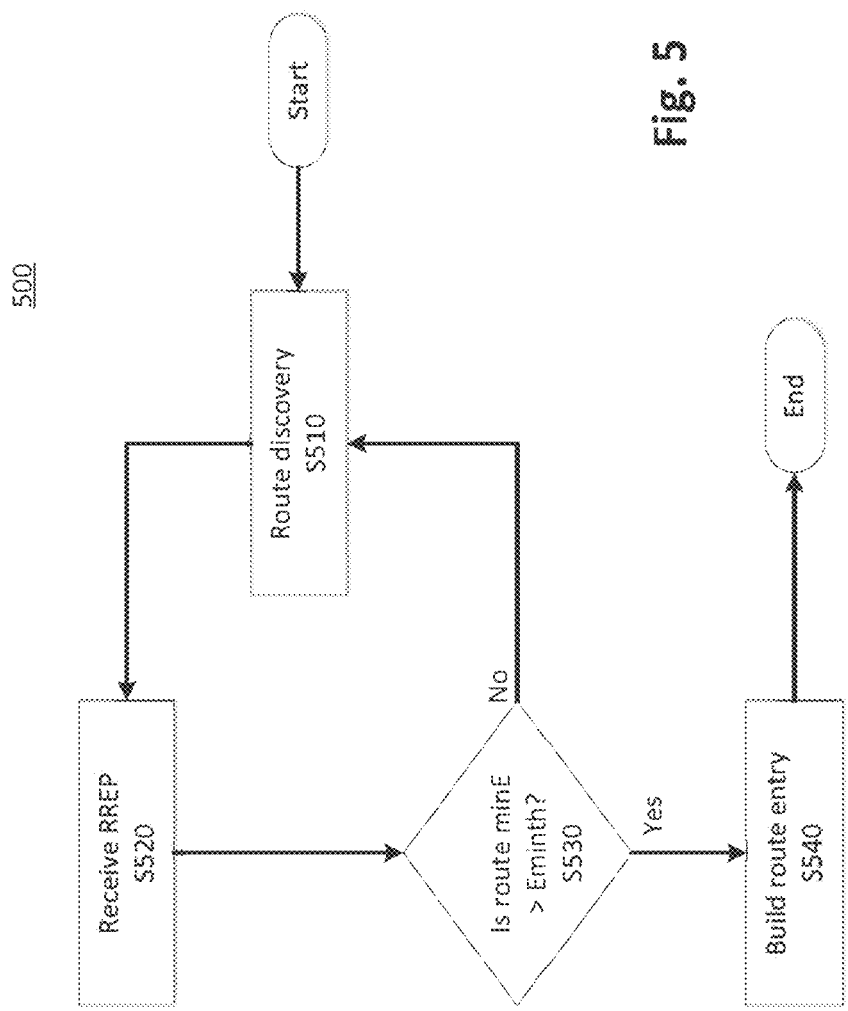
FIG. 5 is an exemplary algorithm for determining route acceptance criteria according to an embodiment.

FIG. 5 is an exemplary algorithm 500 for determining route acceptance criteria in EHAODV, wherein the source node initiates a new route discovery process in step S510. A RREP is received in step S520, and it is determined whether the route minE is greater than a minimum threshold energy (Eminth). If the route minE is not greater than Eminth (a "no" decision in step S530), a new route discovery process is initiated at step S510. If the route minE is greater than Eminth (a "yes" decision in step S530), the discovered route entry is built within the subject node at step S540.

Two route selection methods are described herein. The first method considers the average energy in each node in the path, while the second method depends on the minimum energy.

In the route average energy selection criteria method, the first priority in route selection is given to the route average energy per node. The average energy is computed by dividing sumEnergy field over the hop-count field. If the average energy of the new route is higher than the existing route, the route table is updated by the new route. When the average energy of the new route is not higher than the existing route, it is compared with the minHR field and the route having the higher minHR is selected.

Figure 6:
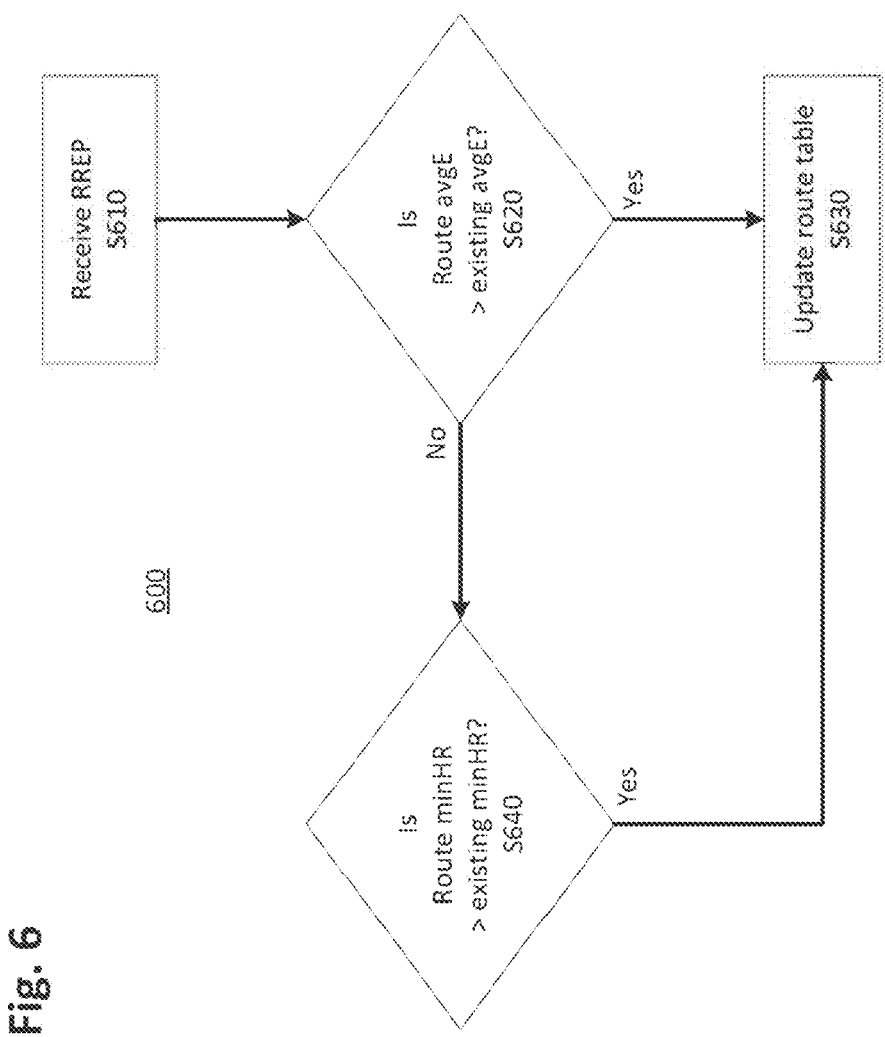
FIG. 6 is an exemplary algorithm for determining a route selection process according to an embodiment.

FIG. 6 is an exemplary algorithm 600 for determining the route selection process based on the average energy and harvesting rate of a new route. When a RREP is received in step S610, it is determined whether the route average energy, avgE of the new route is greater than the existing avgE in step S620. If the route avgE of the new route is greater than the existing avgE (a "yes" decision in step S620), the routing table is updated with the new route information in step S630. If the route avgE of the new route is not greater than the existing avgE (a "no" decision in step S620), it is determined whether the minHR of the new route is greater than the existing minHR in step S640. If the minHR of the new route is greater than the existing minHR (a "yes" decision in step S640), the routing table is updated with the new route information in step S630.

In the routing minimum energy selection criteria method, the energy is not considered as a constraint in the routing when the available energy in each node is higher than a normal threshold energy, Enormth. As a result, the route selection criterion will be the minimum hop-count. This will achieve a minimum delay in a normal situation. When the energy level is less than Enormth, the energy becomes a constraint, so it is given the first priority in choosing the best route. In this situation, a path with a higher number of hop-counts and a higher level of energy is preferred over a path with a smaller number of hop counts and a lower energy level. Although this strategy might result in a higher delay, it is preferred since it saves the energy of weaker nodes and gives them more time to harvest energy.

Figure 7:
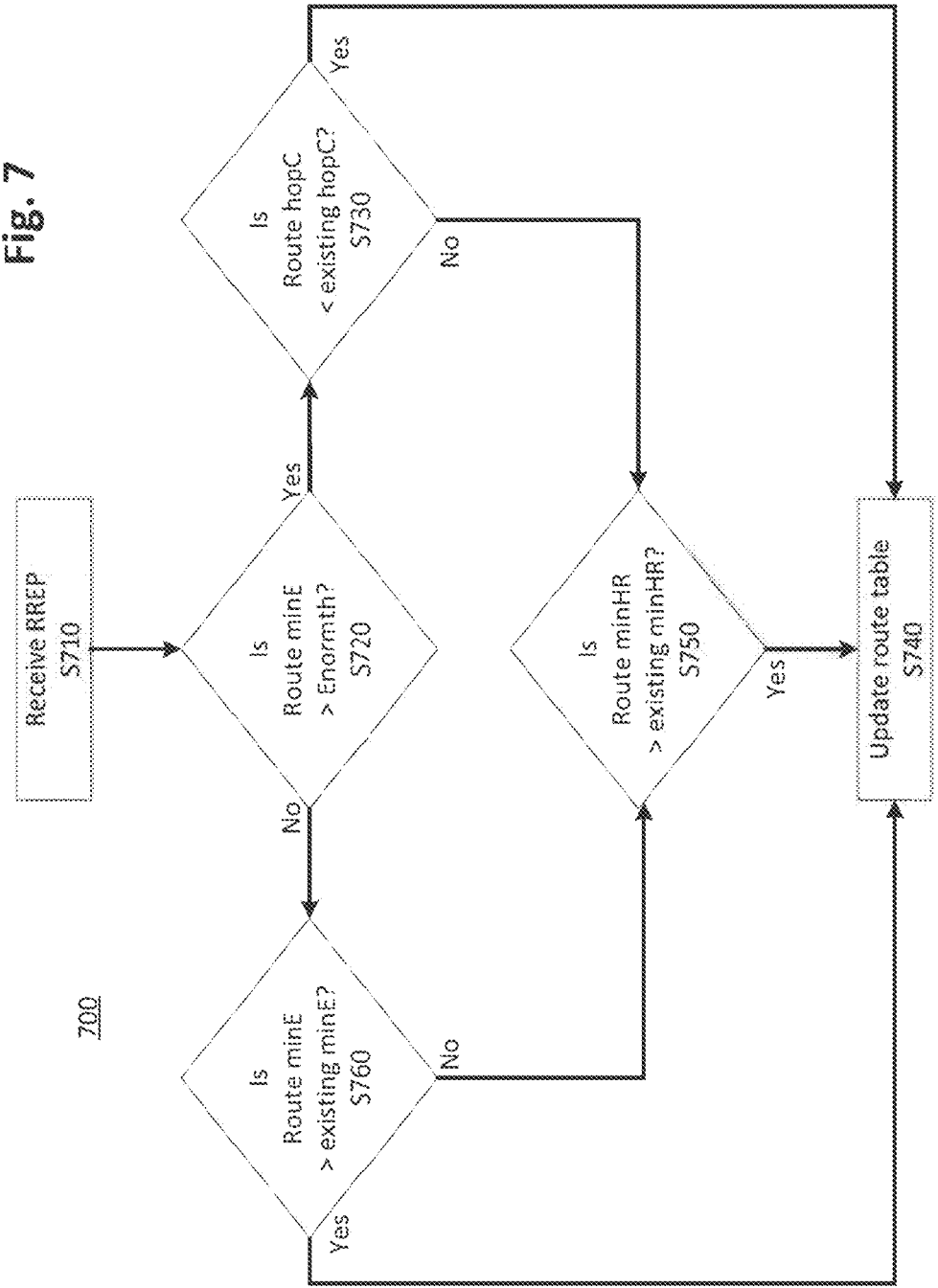
FIG. 7 is an exemplary algorithm for choosing an optimum route based on minimum energy, hop count, and energy harvesting rate according to an embodiment.

FIG. 7 is an exemplary algorithm 700 for choosing an optimum route based on minimum energy, hop count, and energy harvesting rate. When a RREP is received for a subject node in step S710, it is determined whether the route minE is greater than Enormth in step S720. If the route minE is greater than Enormth (a "yes" decision in step S720), it is determined whether the route hop count, hopC is less than the existing hopC in step S730. If the route hopC is less than the existing hopC (a "yes" decision in step S730), the routing table is updated with the new route information in step S740. If the route hopC is not less than the existing hopC (a "no" decision in step S730), it is determined whether the route minHR is greater than the existing minHR in step S750. If the route minHR is greater than the existing minHR (a "yes" decision in step S750), the routing table is updated with the new information in step S740.

If the route minE is not greater than Enormth (a "no" decision in step S720), it is determined whether the route minE is greater than the existing minE in step S760. If the route minE is greater than the existing minE (a "yes" decision in step S760), the routing table is updated with the new information in step S740. If the route minE is not greater than the existing minE (a "no" decision in step S760), it is determined whether the route minHR is greater than the existing minHR in step S750. If so, the routing table is updated with the new information in step S740. In the case where two available routes have the same hop-count and same minimum energy, the route with the highest minHR is chosen.

Figure 8:
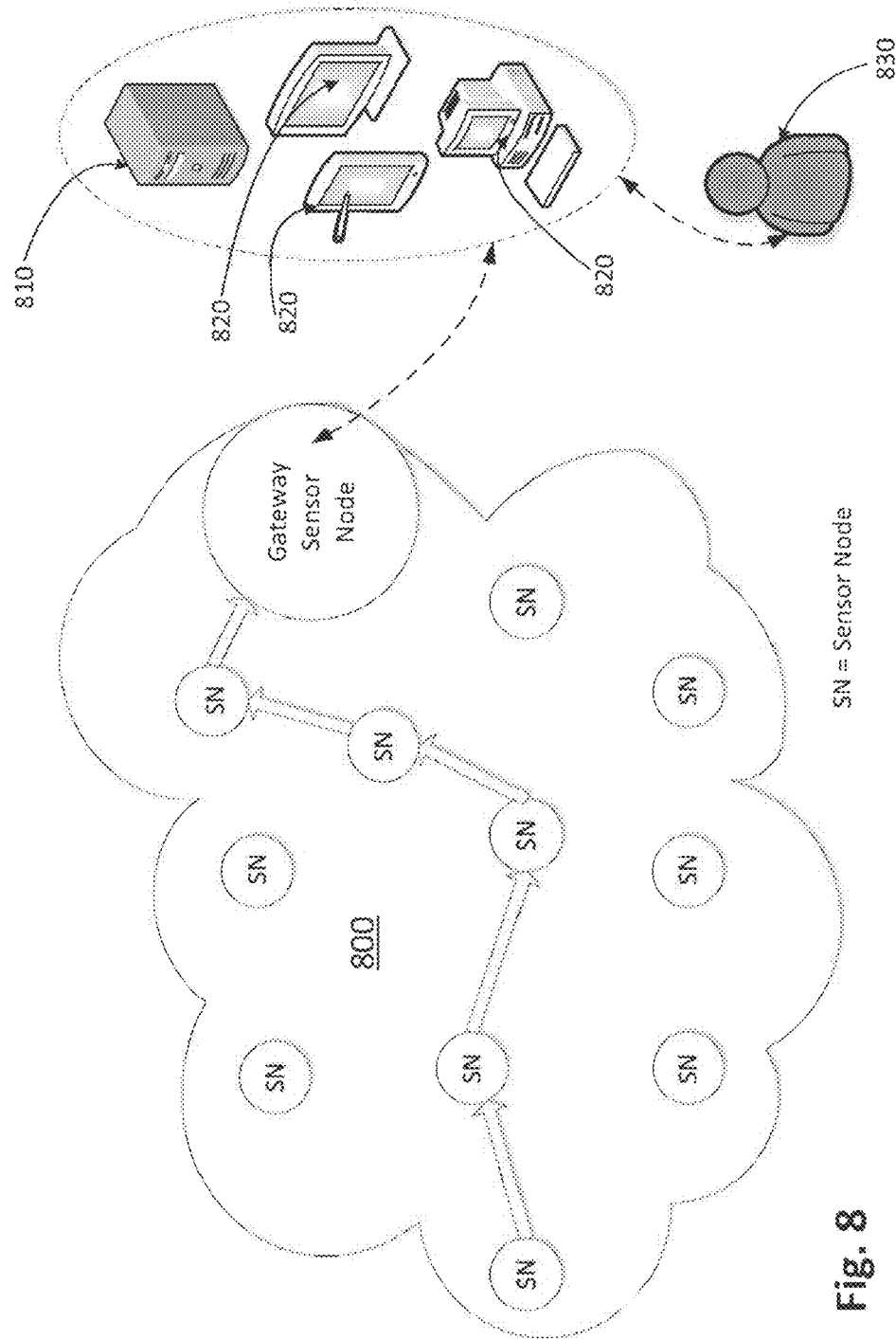
FIG. 8 illustrates an exemplary WSN architecture according to an embodiment.

FIG. 8 illustrates an exemplary WSN architecture 800. A WSN includes a plurality of spatially distributed autonomous sensors, each configured to monitor physical and/or environmental conditions, such as temperature, sound, and pressure and to cooperatively pass their data to an associated sensor node and subsequently through the WSN to a main location, such as a gateway sensor node. A WSN can be bi-directional, which enables it to control sensor activity, as well as receive data from the sensors.

Each sensor node includes structural features for retrieving sensor data and passing the data to an adjacent sensor node, and eventually to the gateway sensor node. Structural node features include a radio transceiver with an internal antenna or connection to an external antenna, a microcontroller, and an electronic circuit for interfacing with other sensor nodes and to an energy source. The energy source can be a battery and/or an embedded form of energy harvesting. A sensor node can vary in size depending upon purpose, cost, and energy requirements.

FIG. 8 also illustrates one or more servers 810 in which the WSN is controlled, and various client devices 820 in which a user 830 has access to the WSN. Connections between the user 830 and the client devices 820 and/or the server 810 can be wired connections and/or wireless connections. Likewise, the connection between the gateway sensor node and the client devices 820 and/or the server 810 can be wired connections and/or wireless connections.

The topology of a WSN can vary from a simple star network to an advanced multi-hop wireless mesh network. FIG. 8 illustrates just a few sensor nodes for simplicity. However, embodiments described herein are not limited to a particular size, topology, or function of the WSN.

Figure 9:
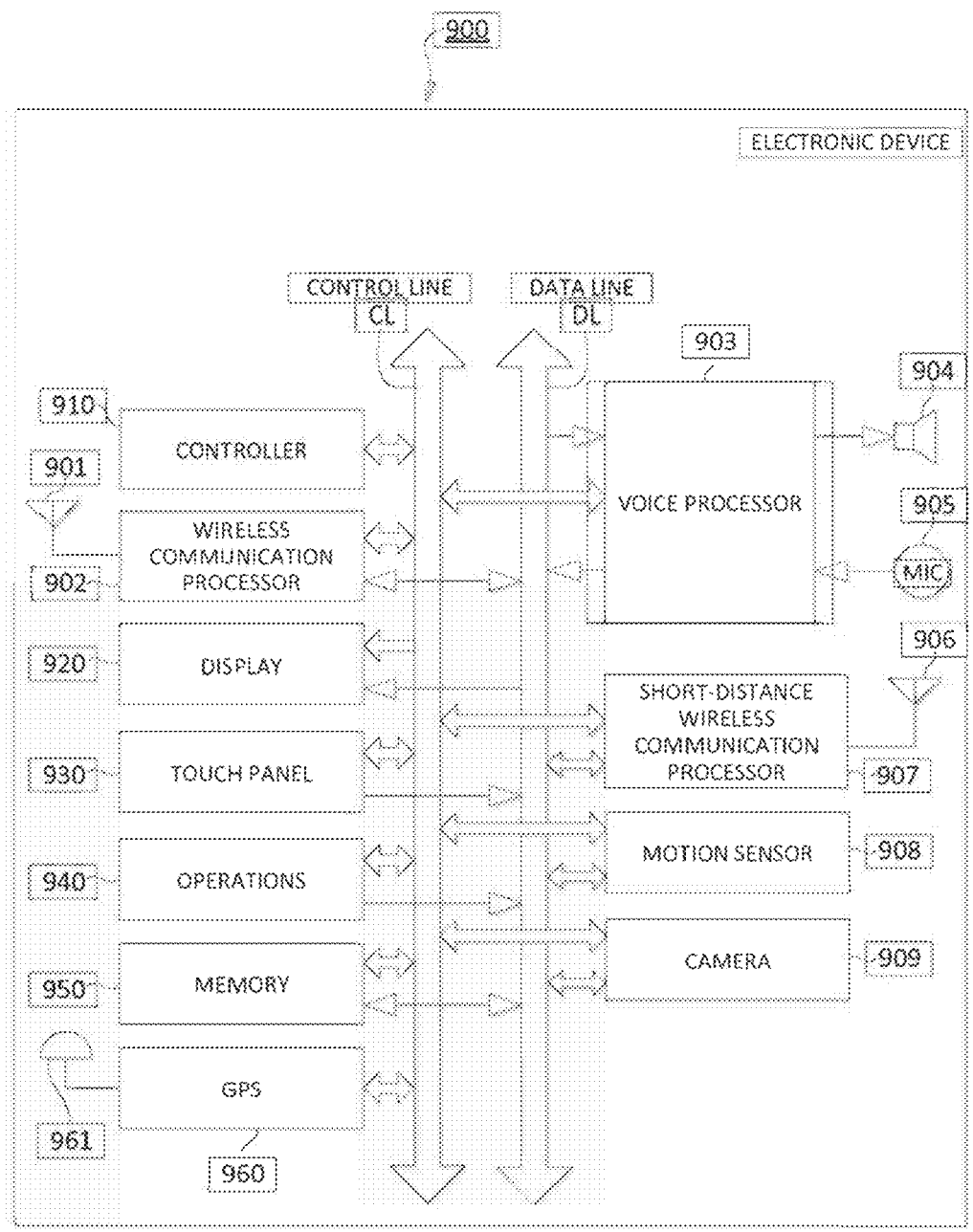
FIG. 9 is a block diagram illustrating an exemplary electronic device according to an embodiment.

FIG. 9 is a block diagram illustrating an exemplary electronic device used in accordance with embodiments of the present disclosure. In the embodiments, electronic device 900 can be a smartphone, a laptop, a tablet, a server, an e-reader, a camera, a navigation device, etc. Electronic device 900 could be used as one or more of the client devices 820 illustrated in FIG. 8.

The exemplary electronic device 900 of FIG. 9 includes a controller 910 and a wireless communication processor 902 connected to an antenna 901. A speaker 904 and a microphone 905 are connected to a voice processor 903. The controller 910 can include one or more Central Processing Units (CPUs), and can control each element in the electronic device 900 to perform functions related to communication control, audio signal processing, control for the audio signal processing, still and moving image processing and control, and other kinds of signal processing. The controller 910 can perform these functions by executing instructions stored in a memory 950. Alternatively or in addition to the local storage of the memory 950, the functions can be executed using instructions stored on an external device accessed on a network or on a non-transitory computer readable medium.

The memory 950 includes but is not limited to Read Only Memory (ROM), Random Access Memory (RAM), or a memory array including a combination of volatile and non-volatile memory units. The memory 950 can be utilized as working memory by the controller 910 while executing the processes and algorithms of the present disclosure. Additionally, the memory 950 can be used for long-term storage, e.g., of image data and information related thereto.

The electronic device 900 includes a control line CL and data line DL as internal communication bus lines. Control data to/from the controller 910 can be transmitted through the control line CL. The data line DL can be used for transmission of voice data, display data, etc.

The antenna 901 transmits/receives electromagnetic wave signals between base stations for performing radio-based communication, such as the various forms of cellular telephone communication. The wireless communication processor 902 controls the communication performed between the electronic device 900 and other external devices via the antenna 901. For example, the wireless communication processor 902 can control communication between base stations for cellular phone communication.

The speaker 904 emits an audio signal corresponding to audio data supplied from the voice processor 903. The microphone 905 detects surrounding audio and converts the detected audio into an audio signal. The audio signal can then be output to the voice processor 903 for further processing. The voice processor 903 demodulates and/or decodes the audio data read from the memory 950 or audio data received by the wireless communication processor 902 and/or a short-distance wireless communication processor 907. Additionally, the voice processor 903 can decode audio signals obtained by the microphone 905.

The exemplary electronic device 900 can also include a display 920, a touch panel 930, an operations key 940, and a short-distance communication processor 907 connected to an antenna 906. The display 920 can be a Liquid Crystal Display (LCD), an organic electroluminescence display panel, or another display screen technology. In addition to displaying still and moving image data, the display 920 can display operational inputs, such as numbers or icons which can be used for control of the electronic device 900. The display 920 can additionally display a GUI for a user to control aspects of the electronic device 900 and/or other devices. Further, the display 920 can display characters and images received by the electronic device 900 and/or stored in the memory 950 or accessed from an external device on a network. For example, the electronic device 900 can access a network such as the Internet and display text and/or images transmitted from a Web server.

The touch panel 930 can include a physical touch panel display screen and a touch panel driver. The touch panel 930 can include one or more touch sensors for detecting an input operation on an operation surface of the touch panel display screen. The touch panel 930 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 930 can detect when the stylus approaches/contacts the operation surface of the touch panel display (similar to the case in which a finger is used for the touch operation).

According to aspects of the present disclosure, the touch panel 930 can be disposed adjacent to the display 920 (e.g., laminated) or can be formed integrally with the display 920. For simplicity, the present disclosure assumes the touch panel 930 is formed integrally with the display 920 and therefore, examples discussed herein can describe touch operations being performed on the surface of the display 920 rather than the touch panel 930. However, the skilled artisan will appreciate that this is not limiting.

For simplicity, the present disclosure assumes the touch panel 930 is a capacitance-type touch panel technology. However, it should be appreciated that aspects of the present disclosure can easily be applied to other touch panel types (e.g., resistance-type touch panels) with alternate structures. According to aspects of the present disclosure, the touch panel 930 can include transparent electrode touch sensors arranged in the X-Y direction on the surface of transparent sensor glass.

The touch panel driver can be included in the touch panel 930 for control processing related to the touch panel 930, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. Signals can be transmitted by the touch panel driver, e.g. in response to a detection of a touch operation, in response to a query from another element based on timed data exchange, etc.

The touch panel 930 and the display 920 can be surrounded by a protective casing, which can also enclose the other elements included in the electronic device 900. According to aspects of the disclosure, a position of the user's fingers on the protective casing (but not directly on the surface of the display 920) can be detected by the touch panel 930 sensors. Accordingly, the controller 910 can perform display control processing described herein based on the detected position of the user's fingers gripping the casing. For example, an element in an interface can be moved to a new location within the interface (e.g., closer to one or more of the fingers) based on the detected finger position.

Further, according to aspects of the disclosure, the controller 910 can be configured to detect which hand is holding the electronic device 900, based on the detected finger position. For example, the touch panel 930 sensors can detect a plurality of fingers on the left side of the electronic device 900 (e.g., on an edge of the display 920 or on the protective casing), and detect a single finger on the right side of the electronic device 900. In this exemplary scenario, the controller 910 can determine that the user is holding the electronic device 900 with his/her right hand because the detected grip pattern corresponds to an expected pattern when the electronic device 900 is held only with the right hand.

The operation key 940 can include one or more buttons or similar external control elements, which can generate an operation signal based on a detected input by the user. In addition to outputs from the touch panel 930, these operation signals can be supplied to the controller 910 for performing related processing and control. According to aspects of the disclosure, the processing and/or functions associated with external buttons and the like can be performed by the controller 910 in response to an input operation on the touch panel 930 display screen rather than the external button, key, etc. In this way, external buttons on the electronic device 900 can be eliminated in lieu of performing inputs via touch operations, thereby improving water-tightness.

The antenna 906 can transmit/receive electromagnetic wave signals to/from other external apparatuses, and the short-distance wireless communication processor 907 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 907.

The electronic device 900 can include a motion sensor 908. The motion sensor 908 can detect features of motion (i.e., one or more movements) of the electronic device 900. For example, the motion sensor 908 can include an accelerometer to detect acceleration, a gyroscope to detect angular velocity, a geomagnetic sensor to detect direction, a geo-location sensor to detect location, etc., or a combination thereof to detect motion of the electronic device 900. According to aspects of the disclosure, the motion sensor 908 can generate a detection signal that includes data representing the detected motion. For example, the motion sensor 908 can determine a number of distinct movements in a motion (e.g., from start of the series of movements to the stop, within a predetermined time interval, etc.), a number of physical shocks on the electronic device 900 (e.g., a jarring, hitting, etc., of the electronic device 900), a speed and/or acceleration of the motion (instantaneous and/or temporal), or other motion features. The detected motion features can be included in the generated detection signal. The detection signal can be transmitted, e.g., to the controller 910, whereby further processing can be performed based on data included in the detection signal. The motion sensor 908 can work in conjunction with a Global Positioning System (GPS) 960. The GPS 960 detects the present position of the electronic device 900. The information of the present position detected by the GPS 960 is transmitted to the controller 910. An antenna 961 is connected to the GPS 960 for receiving and transmitting signals to and from a GPS satellite.

Electronic device 900 can include a camera 909, which includes a lens and shutter for capturing photographs of the surroundings around the electronic device 900. In an embodiment, the camera 909 captures surroundings of an opposite side of the electronic device 900 from the user. The images of the captured photographs can be displayed on the display panel 920. A memory saves the captured photographs. The memory can reside within the camera 909 or it can be part of the memory 950. The camera 909 can be a separate feature attached to the electronic device 900 or it can be a built-in camera feature.

Figure 10:
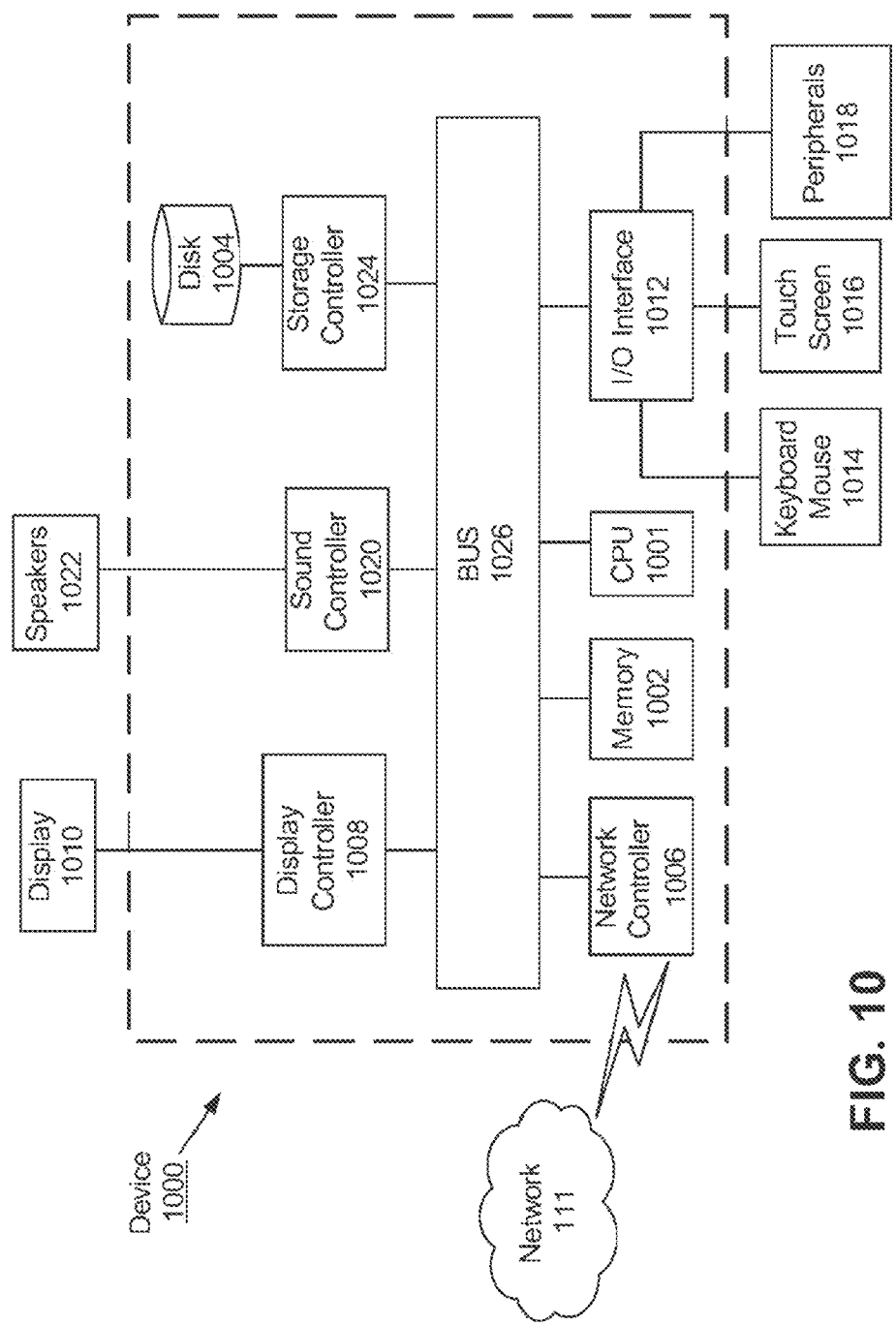
FIG. 10 is a block diagram illustrating an exemplary computing device according to an embodiment.

Next, a hardware description of an exemplary computing device 1000 used in accordance with some embodiments described herein is given with reference to FIG. 10. Features described above with reference to electronic device 900 of FIG. 9 can be included in the computing device 1000 described below. Computing device 1000 could be used as one or more of the client devices 820 or the server(s) 810 illustrated in FIG. 8. Computing device 1000 could also be used as one or more of the sensor nodes or the gateway sensor node illustrated in FIG. 8.

In FIG. 10, the computing device 1000 includes a CPU 1001 which performs the processes described above and herein after. The process data and instructions can be stored in memory 1002. These processes and instructions can also be stored on a storage medium disk 1004 such as a hard drive (HDD) or portable storage medium or can be stored remotely. Further, the claimed features are not limited by the form of the computer-readable media on which the instructions of the process are stored. For example, the instructions can be stored on CDs, DVDs, in FLASH memory, RAM, ROM, PROM, EPROM, EEPROM, hard disk or any other information processing device with which the computing device 1000 communicates, such as a server or computer.

Further, the claimed features can be provided as a utility application, background daemon, or component of an operating system, or combination thereof, executing in conjunction with CPU 1001 and an operating system such as Microsoft Windows 7, UNIX, Solaris, LINUX, Apple MAC-OS and other systems known to those skilled in the art.

The hardware elements in order to achieve the computing device 1000 can be realized by various circuitry elements, known to those skilled in the art. For example, CPU 1001 can be a Xenon or Core processor from Intel of America or an Opteron processor from AMD of America, or can be other processor types that would be recognized by one of ordinary skill in the art. Alternatively, the CPU 1001 can be implemented on an FPGA, ASIC, PLD or using discrete logic circuits, as one of ordinary skill in the art would recognize. Further, CPU 1001 can be implemented as multiple processors cooperatively working in parallel to perform the instructions of the inventive processes described above and below.

The computing device 1000 in FIG. 10 also includes a network controller 1006, such as an Intel Ethernet PRO network interface card from Intel Corporation of America, for interfacing with network 111. As can be appreciated, the network 111 can be a public network, such as the Internet, or a private network such as an LAN or WAN network, or any combination thereof and can also include PSTN or ISDN sub-networks. The network 111 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device 1000 further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. Touch screen panel 1016 includes features described above with reference to touch panel 930 of FIG. 9. General purpose I/O interface 1012 also connects to a variety of peripherals 1018 including printers and scanners, such as an OfficeJet or DeskJet from Hewlett Packard.

A sound controller 1020 is also provided in the computing device 1000, such as Sound Blaster X-Fi Titanium from Creative, to interface with speakers/microphone 1022 thereby providing sounds and/or music.

The general purpose storage controller 1024 connects the storage medium disk 1004 with communication bus 1026, which can be an ISA, EISA, VESA, PCI, or similar, for interconnecting all of the components of the computing device 1000. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure can be replaced with other elements and structured differently than the examples provided herein. Moreover, circuitry configured to perform features described herein can be implemented in multiple circuit units (e.g., chips), or the features can be combined in circuitry on a single chipset, as shown on FIG. 11. The chipset of FIG. 11 can be implemented in conjunction with either electronic device 900 or computing device 1000 described above with reference to FIGS. 9 and 10, respectively.

Figure 11:
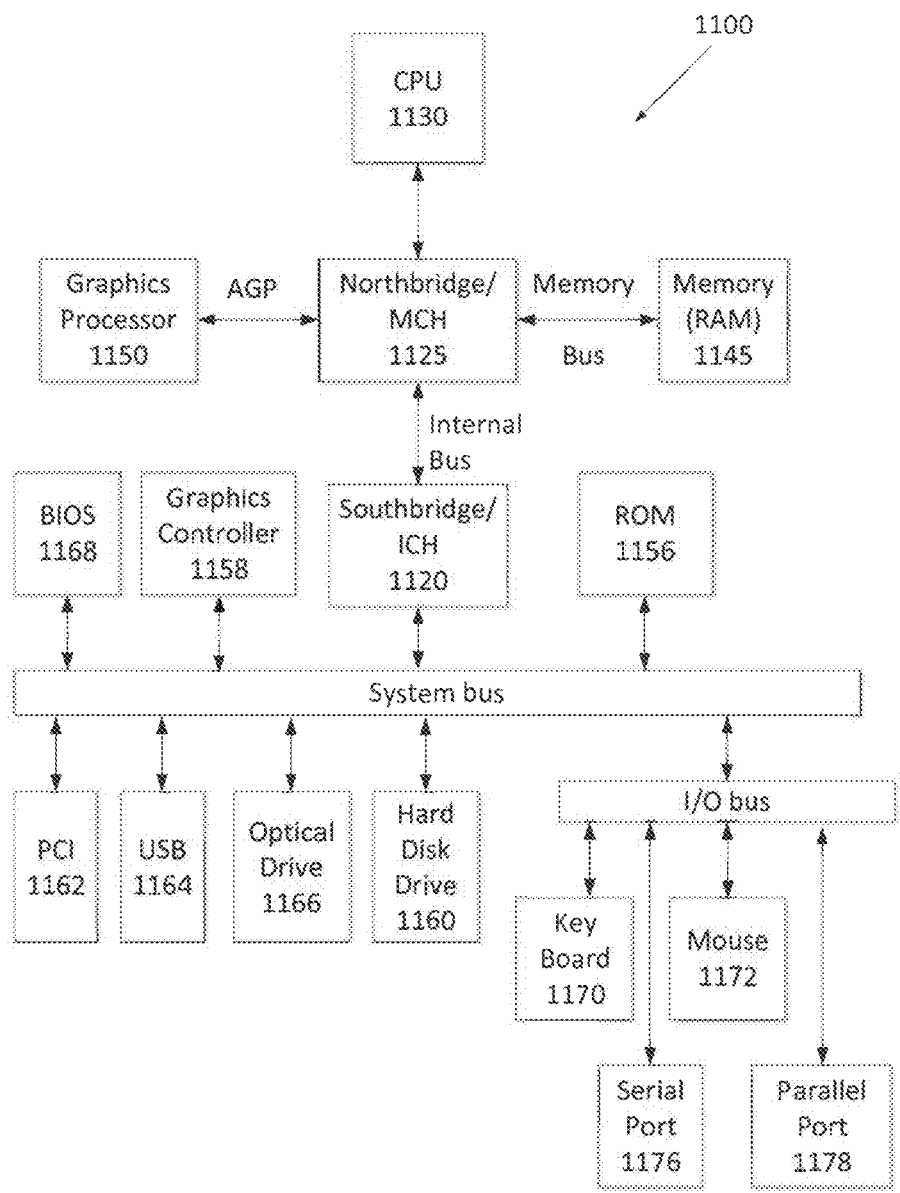
FIG. 11 is a block diagram illustrating an exemplary chipset according to an embodiment.

FIG. 11 shows a schematic diagram of a data processing system, according to aspects of the disclosure described herein for performing menu navigation, as described above. The data processing system is an example of a computer in which code or instructions implementing the processes of the illustrative embodiments can be located.

In FIG. 11, data processing system 1100 employs an application architecture including a north bridge and memory controller application (NB/MCH) 1125 and a south bridge and input/output (I/O) controller application (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU 1130 can contain one or more processors and even can be implemented using one or more heterogeneous processor systems.

Figure 12:
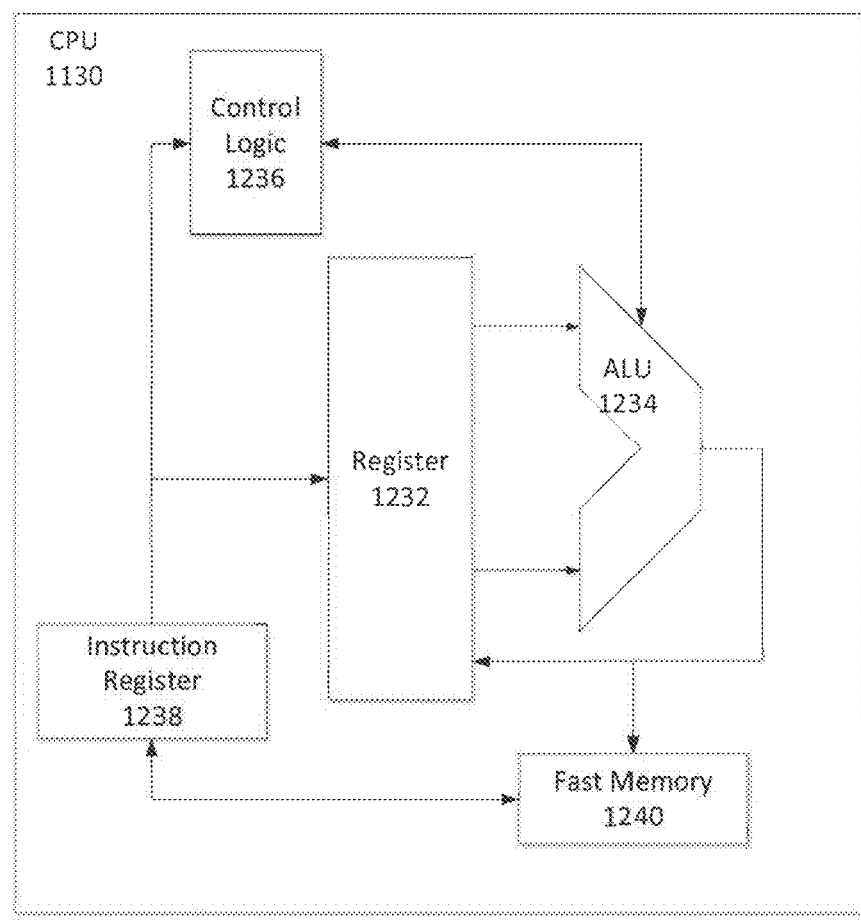
FIG. 12 is a block diagram illustrating an exemplary CPU of a chipset according to an embodiment.

For example, FIG. 12 shows one implementation of CPU 1130. In one implementation, an instruction register 1238 retrieves instructions from a fast memory 1240. At least part of these instructions are fetched from an instruction register 1238 by a control logic 1236 and interpreted according to the instruction set architecture of the CPU 1130. Part of the instructions can also be directed to a register 1232. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 1234 that loads values from the register 1232 and performs logical and mathematical operations on the loaded values according to the instructions. The results from these operations can be fed back into the register 1232 and/or stored in a fast memory 1240. According to aspects of the disclosure, the instruction set architecture of the CPU 1130 can use a reduced instruction set computer (RISC), a complex instruction set computer (CISC), a vector processor architecture, or a very long instruction word (VLIW) architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 11, the data processing system 1100 can include the SB/ICH 1120 being coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices can include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein can also be executed by various distributed components of a system. For example, one or more processors can execute these system functions, wherein the processors are distributed across multiple components communicating in a network. The distributed components can include one or more client and server machines, which can share processing, such as a cloud computing system, in addition to various human interface and communication devices (e.g., display monitors, smart phones, tablets, personal digital assistants (PDAs)). The network can be a private network, such as a LAN or WAN, or can be a public network, such as the Internet. Input to the system can be received via direct user input and received remotely either in real-time or as a batch process. Additionally, some implementations can be performed on modules or hardware not identical to those described. Accordingly, other implementations are within the scope that can be claimed.

The functions and features described herein may also be executed by various distributed components of a system. For example, one or more processors may execute these system functions, wherein the processors are distributed across multiple components communicating in a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

Figure 13:
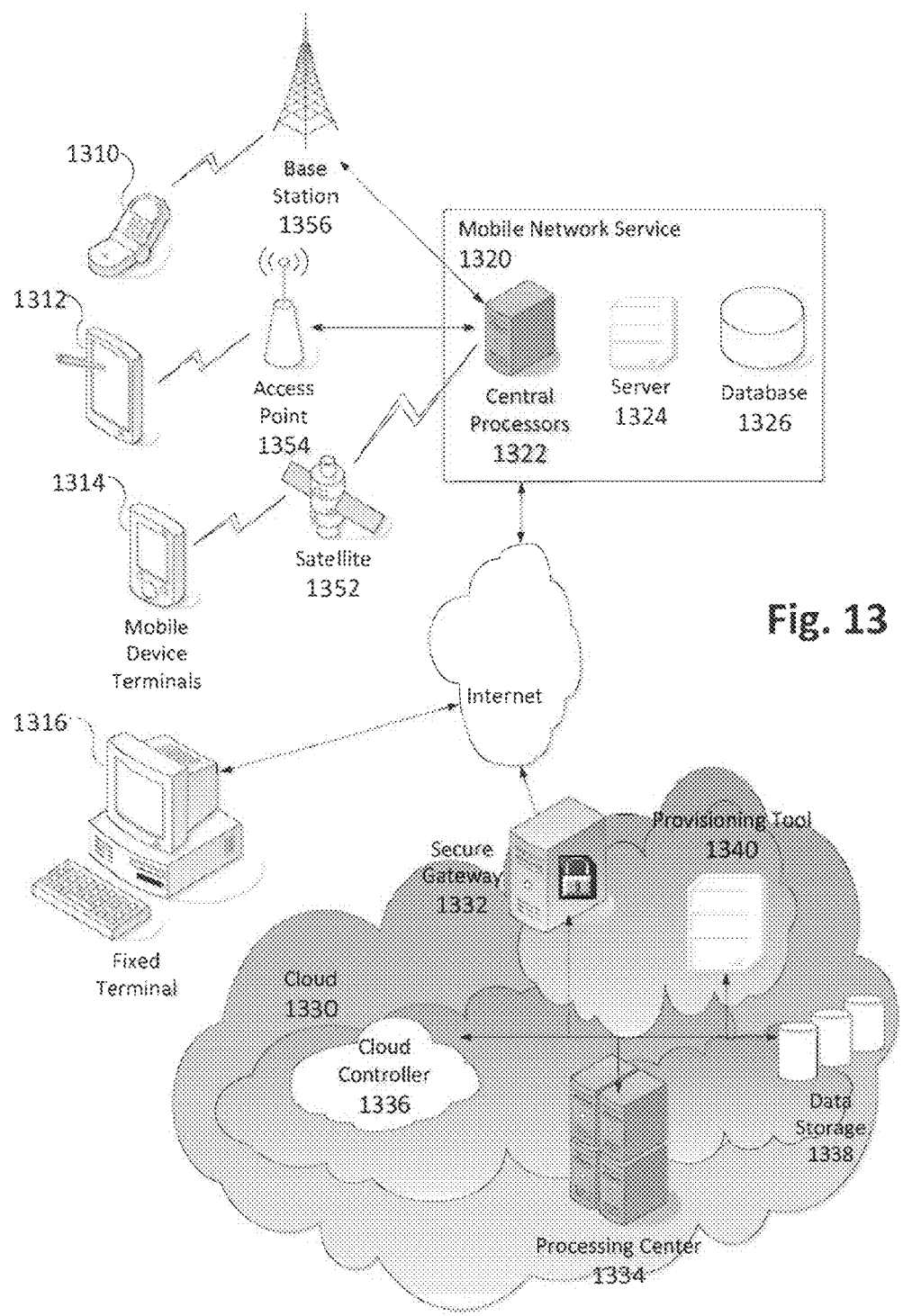
FIG. 13 illustrates an exemplary cloud computing system according to an embodiment.

FIG. 13 illustrates an example of a cloud computing system, wherein users access the cloud through mobile device terminals or fixed terminals that are connected to the Internet. One or more of the devices illustrated in the WSN architecture 800 of FIG. 8 could be used in the cloud computing system illustrated in FIG. 13.

The mobile device terminals can include a cell phone 1310, a tablet computer 1312, and a smartphone 1314, for example. The mobile device terminals can connect to a mobile network service 1320 through a wireless channel such as a base station 1356 (e.g., an Edge, 3G, 4G, or LTE Network), an access point 1354 (e.g., a femto cell or WiFi network), or a satellite connection 1352. In one implementation, signals from the wireless interface to the mobile device terminals (e.g., the base station 1356, the access point 1354, and the satellite connection 1352) are transmitted to a mobile network service 1320, such as an EnodeB and radio network controller, UMTS, or HSDPA/HSUPA. Mobile users' requests and information are transmitted to central processors 1322 that are connected to servers 1324 to provide mobile network services, for example. Further, mobile network operators can provide service to mobile users for authentication, authorization, and accounting based on home agent and subscribers' data stored in databases 1326, for example. The subscribers' requests are subsequently delivered to a cloud 1330 through the Internet.

A user can also access the cloud through a fixed terminal 1316, such as a desktop or laptop computer or workstation that is connected to the Internet via a wired network connection or a wireless network connection. The mobile network service 1320 can be a public or a private network such as an LAN or WAN network. The mobile network service 1320 can be wireless such as a cellular network including EDGE, 3G and 4G wireless cellular systems. The wireless mobile network service 1320 can also be Wi-Fi, Bluetooth, or any other wireless form of communication that is known.

The user's terminal, such as a mobile user terminal and a fixed user terminal, provides a mechanism to connect via the Internet to the cloud 1330 and to receive output from the cloud 1330, which is communicated and displayed at the user's terminal. In the cloud 1330, a cloud controller 1336 processes the request to provide users with the corresponding cloud services. These services are provided using the concepts of utility computing, virtualization, and service-oriented architecture.

In one implementation, the cloud 1330 is accessed via a user interface such as a secure gateway 1332. The secure gateway 1332 can for example, provide security policy enforcement points placed between cloud service consumers and cloud service providers to interject enterprise security policies as the cloud-based resources are accessed. Further, the secure gateway 1332 can consolidate multiple types of security policy enforcement, including for example, authentication, single sign-on, authorization, security token mapping, encryption, tokenization, logging, alerting, and API control. The cloud 1330 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 1340 that prepares and equips the cloud resources, such as the processing center 1334 and data storage 1338 to provide services to the users of the cloud 1330. The processing center 1334 can be a computer cluster, a data center, a main frame computer, or a server farm. In one implementation, the processing center 1334 and data storage 1338 are collocated.

Embodiments described herein can be implemented in conjunction with one or more of the devices described above with reference to FIGS. 9-13. Embodiments are a combination of hardware and software, and circuitry by which the software is implemented.

FIG. 14 illustrates an exemplary algorithmic flowchart for a method of locating a route in a WSN. The hardware description above, exemplified by any one of the structural examples shown in FIG. 9, 10, or 11, constitutes or includes specialized corresponding structure that is programmed or configured to perform the algorithm illustrated in FIG. 14. For example, the algorithm shown in FIG. 14 may be completely performed by the circuitry included in the single device shown in FIG. 9 or 10, or the chipset as shown in FIG. 11, or the algorithm may be completely performed in a shared manner distributed over the circuitry of any plurality of the devices shown in FIG. 13.

Method 1400 illustrated in the algorithmic flowchart of FIG. 14 includes receiving a route request at an instant sensor node from an adjacent sensor node in step S1410, and determining whether a route from an origination sensor node to a destination sensor node in the received route request exists in step S1420. Method 1400 also includes comparing a remaining energy of the instant sensor node to an existing minimum energy from the received route request in step S1430, and setting a new minimum energy in the received route request equal to the remaining energy of the instant sensor node when the remaining energy is less than the existing minimum energy in the received route request in step S1440. Method 1400 also includes comparing an energy harvesting rate of the instant sensor node to an existing minimum energy harvesting rate in the received route request in step S1450, and setting a new minimum energy harvesting rate in the received route request equal to the energy harvesting rate of the instant sensor node when the energy harvesting rate of the instant sensor node is less than the existing minimum energy harvesting rate in step S1460. Method 1400 also includes broadcasting destination route instant values of a minimum energy, a minimum energy harvesting rate, and an energy sum to the WSN via a minimum energy field, a minimum energy harvesting rate field, and a sum of energy field, respectively from a message packet of the received route request, wherein the WSN includes a plurality of sensor nodes configured with circuitry to receive sensor data from one or more connected sensors in step S1470.

Method 1400 can also include repeating the steps of method 1400 until the destination sensor node is reached. Method 1400 can also include forwarding a route reply from the destination sensor node to the origination sensor node. The route reply can include return route instant values of the minimum energy, the minimum energy harvesting rate, and the energy sum from a message packet of the forwarded route reply.

Method 1400 can also include determining the return route instant values by comparing the minimum energy and the minimum energy harvesting rate of the instant sensor node with data contained in the minimum energy field and the minimum energy harvesting rate field, respectively of the message packet of the forwarded route reply, and setting a lower value of the minimum energy and the minimum energy harvesting rate in the message packet of the forwarded route reply from the comparing. Method 1400 can also include determining whether a route minimum energy is greater than a minimum threshold energy, and discovering a new route when the route minimum energy is not greater than the minimum threshold energy.

Method 1400 can also include determining whether a route average energy is greater than an existing average energy, determining whether a route minimum energy harvesting rate is greater than an existing minimum energy harvesting rate when the route average energy is not greater than the existing average energy, and updating a route table with resulting data from the determining steps.

Method 1400 can also include determining whether a route minimum energy is greater than a normal threshold energy, determining whether a route hop count is greater than an existing hop count when the route minimum energy is greater than the normal threshold energy, determining whether a route minimum energy harvesting rate is greater than an existing minimum energy harvesting rate when the route hop count is not less than the existing hop count, and updating a route table with resulting data from the determining steps.

Method 1400 can also include determining whether a route minimum energy is greater than a normal threshold energy, determining whether a route minimum energy is greater than an existing minimum energy when the route minimum energy is not greater than the normal threshold energy, determining whether a route minimum energy harvesting rate is greater than an existing minimum energy harvesting rate when the route minimum energy is not greater than the existing minimum energy, and updating a route table with resulting data from the determining steps.

A WSN has a plurality of sensor nodes configured with a radio transceiver and electronic circuitry for interfacing with one or more associated sensors. The WSN also includes a gateway sensor node configured to receive sensor data from and forward instructions to the one or more sensor nodes, and a server configured to control the WSN in combination with the gateway sensor node. The WSN also includes circuitry configured to process a route request message from an origination sensor node to a destination sensor node via a routing protocol. A message packet of each of the plurality of sensor nodes includes a minimum energy field, a minimum energy harvesting rate field, and a sum of energy field. The circuitry is also configured to determine a new delivery route based upon comparing a minimum energy and a minimum energy harvesting rate of an instant sensor node with a minimum energy and a minimum energy harvesting rate contained in the message packet, and select a lower minimum energy and a lower minimum energy harvesting rate from the instant sensor node or the message packet. The circuitry is also configured to broadcast the lower minimum energy and the lower minimum energy harvesting rate throughout the WSN, and continue the processing, determining, and broadcasting until the destination sensor node is reached.

The WSN circuitry can also be configured to forward a route reply from the destination sensor node to the origination sensor node via the routing protocol when the new delivery route has been determined. The route reply message from the destination sensor node to the origination sensor node can include data from comparing the minimum energy and the minimum energy harvesting rate of the instant sensor node with data contained in the minimum energy field and the minimum energy harvesting rate field, respectively of the message packet of the forwarded route reply. The WSN circuitry can also be configured to determine whether a route minimum energy from the route reply message is greater than a minimum threshold energy, and to discover another delivery route when the route minimum energy is not greater than the minimum threshold energy. The routing protocol can include an Ad hoc On demand Distance Vector (AODV) protocol.

The WSN circuitry can also be configured to determine whether a route average energy calculated from the route reply message is greater than an existing average energy, and to determine whether a route minimum energy harvesting rate from the route reply message is greater than an existing minimum energy harvesting rate when the route average energy is not greater than the existing average energy.

The WSN circuitry can also be configured to determine whether a route minimum energy from the route reply message is greater than a normal threshold energy. The circuitry can be configured to determine whether a route hop count is less than an existing hop count when the route minimum energy is greater than the normal threshold energy, and to determine whether a route minimum energy is greater than an existing minimum energy when the route minimum energy is not greater than the normal threshold energy. The circuitry can be configured to determine whether a route minimum energy harvesting rate is greater than an existing minimum energy harvesting rate when the route hop count is not less than the existing hop count and when the route minimum energy is not greater than the existing minimum energy.

Another embodiment includes a WSN having a plurality of sensor nodes, wherein each of the sensor nodes has circuitry configured to receive a route request at an instant sensor node from an adjacent sensor node, and determine whether a route from an origination sensor node to a destination sensor node in the received route request exists. The circuitry is also configured to compare a remaining energy of the instant sensor node to an existing minimum energy from the received route request, and set a new minimum energy in the received route request equal to the remaining energy of the instant sensor node when the remaining energy is less than the existing minimum energy. The circuitry is also configured to compare an energy harvesting rate of the instant sensor node to an existing minimum energy harvesting rate in the received route request, and set a new minimum energy harvesting rate in the received route request equal to the energy harvesting rate of the instant sensor node when the energy harvesting rate is less than the existing minimum energy harvesting rate. The circuitry is also configured to broadcast destination route instant values of a minimum energy, a minimum energy harvesting rate, and an energy sum to the WSN via a minimum energy field, a minimum energy harvesting rate field, and a sum of energy field, respectively from a message packet of the received route request. The circuitry can also be configured to forward a route reply from the destination sensor node to the origination sensor node, wherein the route reply includes return route instant values of the minimum energy, the minimum energy harvesting rate, and the energy sum from a message packet of the forwarded route reply.

Embodiments described herein can be implemented with either chargeable or non-chargeable sensor nodes, wherein multiple criteria are used to select an optimum routing path. This provides a longer data session life and higher throughput with acceptable end-to-end delay and fewer link outages, i.e. when a sensor node exhausts its energy. Systems and methods described herein select a communication path based on an optimum minimum energy and average energy, and based on a minimum hop count. This allows the sensor nodes to harvest energy efficiently and recharge, which sustains the communication path for a longer duration. As a result, the sensor nodes are more efficient and thereby support more data transmission.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative and not limiting thereof. The disclosure, including any readily discernible variants of the teachings herein defines in part, the scope of the foregoing claim terminology.

The invention claimed is:

1. A wireless sensor network (WSN), comprising:
   a plurality of sensor nodes, each configured with a radio transceiver and electronic circuitry for interfacing with one or more associated sensors;
   a gateway sensor node configured to receive sensor data from and forward instructions to the one or more sensor nodes;
   a server configured to control the WSN in combination with the gateway sensor node; and
   circuitry configured to
   process a route request message from an origination sensor node to a destination sensor node via a routing protocol that includes an Ad hoc On demand Distance Vector (AODV) protocol, wherein a message packet of each of the plurality of sensor nodes includes a minimum energy field, a minimum energy harvesting rate field, and a sum of energy field;
   determine a new delivery route based upon comparing a minimum energy and a minimum energy harvesting rate of an instant sensor node with a minimum energy and a minimum energy harvesting rate contained in the message packet, and select a lower minimum energy and a lower minimum energy harvesting rate from the instant sensor node or the message packet;
   forward a route reply from the destination sensor node to the origination sensor node via the routing protocol when the new delivery route has been determined;
   broadcast the lower minimum energy and the lower minimum harvesting rate throughout the WSN; and
   continue the processing, determining, and broadcasting until the destination sensor node is reached.

2. The WSN of claim 1, wherein the route reply message from the destination sensor node to the origination sensor node includes data from comparing the minimum energy and the minimum energy harvesting rate of the instant sensor node with data contained in the minimum energy field and the minimum energy harvesting rate field, respectively of the message packet of the forwarded route reply.

3. The WSN of claim 1, wherein the circuitry is further configured to determine whether a route minimum energy from the route reply message is greater than a minimum threshold energy, and to discover another delivery route when the route minimum energy is not greater than the minimum threshold energy.

4. The WSN of claim 1, wherein the circuitry is further configured to determine whether a route average energy calculated from the route reply message is greater than an existing average energy.

5. The WSN of claim 1, wherein the circuitry is further configured to determine whether a route minimum energy harvesting rate from the route reply message is greater than an existing minimum energy harvesting rate when the route average energy is not greater than the existing average energy.

6. The WSN of claim 1, wherein the circuitry is further configured to determine whether a route minimum energy from the route reply message is greater than a normal threshold energy.

7. The WSN of claim 1, wherein the circuitry is further configured to determine whether a route hop count is less than an existing hop count when the route minimum energy is greater than the normal threshold energy, and is further configured to determine whether a route minimum energy is greater than an existing minimum energy when the route minimum energy is not greater than the normal threshold energy.

8. The WSN of claim 1, wherein the circuitry is further configured to determine whether a route minimum energy harvesting rate is greater than an existing minimum energy harvesting rate when the route hop count is not less than the existing hop count and when the route minimum energy is not greater than the existing minimum energy.

* * * * *